US008859981B1

(12) United States Patent
Stoian et al.

(10) Patent No.: US 8,859,981 B1
(45) Date of Patent: Oct. 14, 2014

(54) METHOD FOR AUTONOMOUS SELF-BLANKING BY RADIATION PORTAL MONITORS TO MINIMIZE THE INTERFERENCE FROM PULSED X-RAYS RADIATION

(71) Applicant: Science Applications International Corporation, San Diego, CA (US)

(72) Inventors: Adrian Stoian, Vista, CA (US); Gregory Alan Greenwood, Vista, CA (US)

(73) Assignee: Leidos, Inc., Reston, VA (US)

( * ) Notice: Subject to any disclaimer, the term of this patent is extended or adjusted under 35 U.S.C. 154(b) by 153 days.

(21) Appl. No.: 13/672,379

(22) Filed: Nov. 8, 2012

(51) Int. Cl.
  *G01J 1/42* (2006.01)
  *G01N 23/00* (2006.01)

(52) U.S. Cl.
  CPC .................................. *G01N 23/00* (2013.01)
  USPC ........................................................ 250/395

(58) Field of Classification Search
  CPC .................................................. H02M 3/33507
  USPC ........................................................ 250/395
  See application file for complete search history.

(56) References Cited

U.S. PATENT DOCUMENTS

| | | | | |
|---|---|---|---|---|
| 4,194,634 | A * | 3/1980 | Kelly .............................. | 209/589 |
| 5,077,549 | A * | 12/1991 | Hershkovitz et al. .......... | 340/567 |
| 6,255,654 | B1 | 7/2001 | Verbinski et al. ........... | 250/358.1 |
| 6,507,025 | B1 | 1/2003 | Verbinski et al. ........... | 250/358.1 |
| 6,552,346 | B2 | 4/2003 | Verbinski et al. ........... | 250/358.1 |
| 6,600,161 | B2 * | 7/2003 | Desaute et al. ................ | 250/395 |
| 6,953,937 | B2 * | 10/2005 | Reber et al. .................... | 250/395 |
| 7,039,159 | B2 | 5/2006 | Muenchau et al. .............. | 378/57 |
| 7,045,787 | B1 | 5/2006 | Verbinski et al. ........... | 250/358.1 |
| 7,166,844 | B1 | 1/2007 | Gormley et al. ............ | 250/358.1 |
| 7,215,738 | B2 | 5/2007 | Muenchau et al. .............. | 378/57 |
| 7,335,887 | B1 | 2/2008 | Verbinski et al. ........... | 250/358.1 |
| 7,352,844 | B1 | 4/2008 | Muenchau et al. .............. | 378/57 |
| 7,365,332 | B2 | 4/2008 | Verbinski et al. ........... | 250/358.1 |
| 7,368,717 | B2 | 5/2008 | Verbinski et al. ........... | 250/358.1 |
| 7,388,205 | B1 | 6/2008 | Verbinski et al. ........... | 250/358.1 |
| 7,388,209 | B1 | 6/2008 | Gormley et al. ......... | 250/370.11 |
| 7,408,160 | B2 | 8/2008 | Verbinski et al. ........... | 250/358.1 |
| 7,430,479 | B1 | 9/2008 | Holslin et al. .................. | 702/22 |
| 7,453,987 | B1 | 11/2008 | Richardson .................. | 378/98.9 |
| 7,596,275 | B1 | 9/2009 | Richardson et al. .......... | 382/224 |
| 7,742,568 | B2 | 6/2010 | Smith ........................ | 378/98.11 |
| 7,957,506 | B2 | 6/2011 | Smith ........................... | 378/57 |
| 8,116,431 | B2 | 2/2012 | Smith ........................ | 378/98.11 |
| 8,598,536 | B2 * | 12/2013 | Jarron et al. .................. | 250/395 |
| 8,618,495 | B2 * | 12/2013 | De Geronimo ............... | 250/395 |
| 2003/0122084 | A1 * | 7/2003 | Desaute et al. ............... | 250/395 |
| 2010/0181491 | A1 * | 7/2010 | Karim et al. ................... | 250/394 |
| 2013/0057323 | A1 * | 3/2013 | Spini et al. .................... | 327/142 |

OTHER PUBLICATIONS

U.S. Appl. No. 11/033,552, filed Jan. 12, 2005, Vourvopoulos, et al.

* cited by examiner

*Primary Examiner* — Kiho Kim
(74) *Attorney, Agent, or Firm* — Dawn-Marie Bey; Bey & Cotropia PLLC

(57) ABSTRACT

A system and associated method for isolating intended radiation signals for determining target characteristics includes multiple detectors for detecting radiation signals having varying energies, delay modules for delaying the detected radiation signals and a discriminator associated with the multiple detectors for determining if detected radiation signals include unintended radiation signals, e.g., x-rays, and provided blanking signals to a switch in order to effectively remove the unintended radiation signals from the data that is presented to the processor for determining target characteristics.

20 Claims, 9 Drawing Sheets

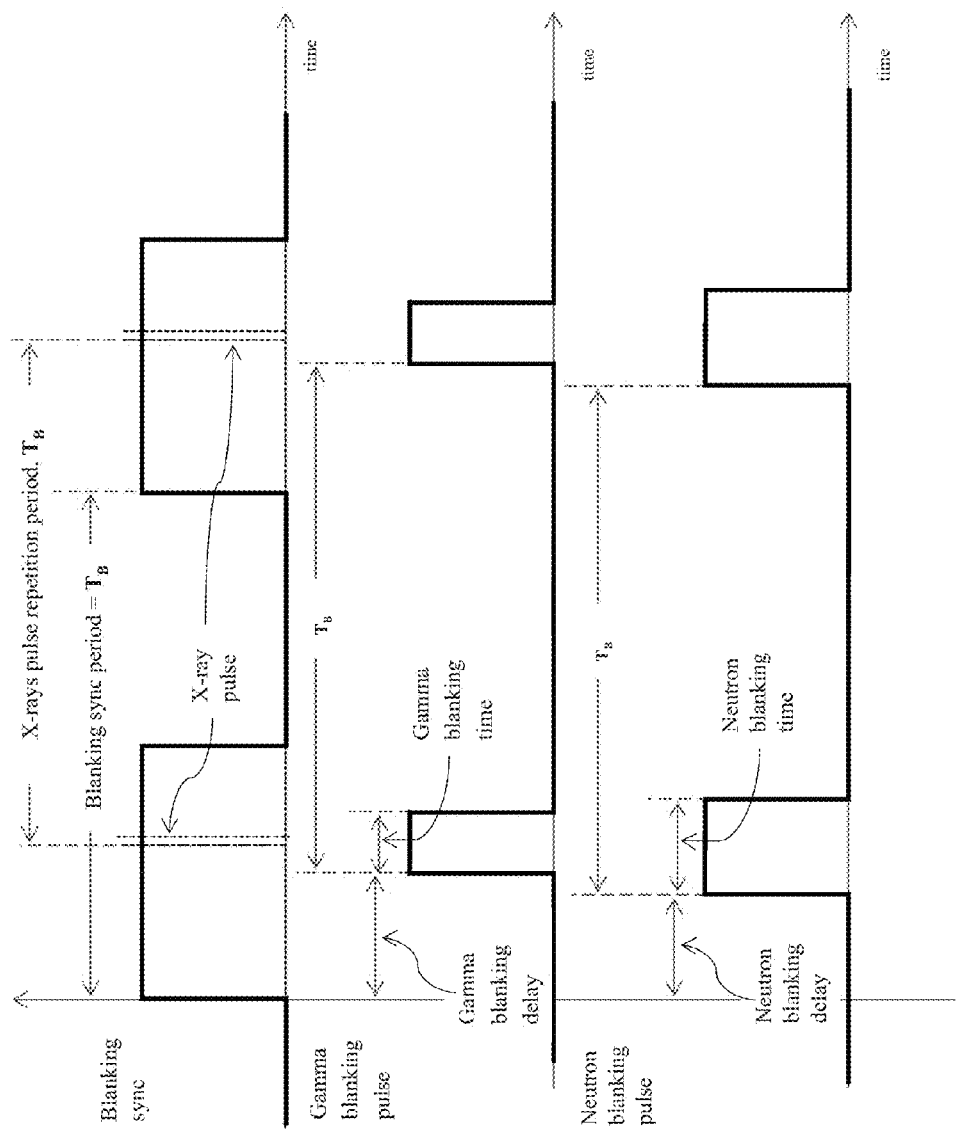
Figure 1 - Prior Art

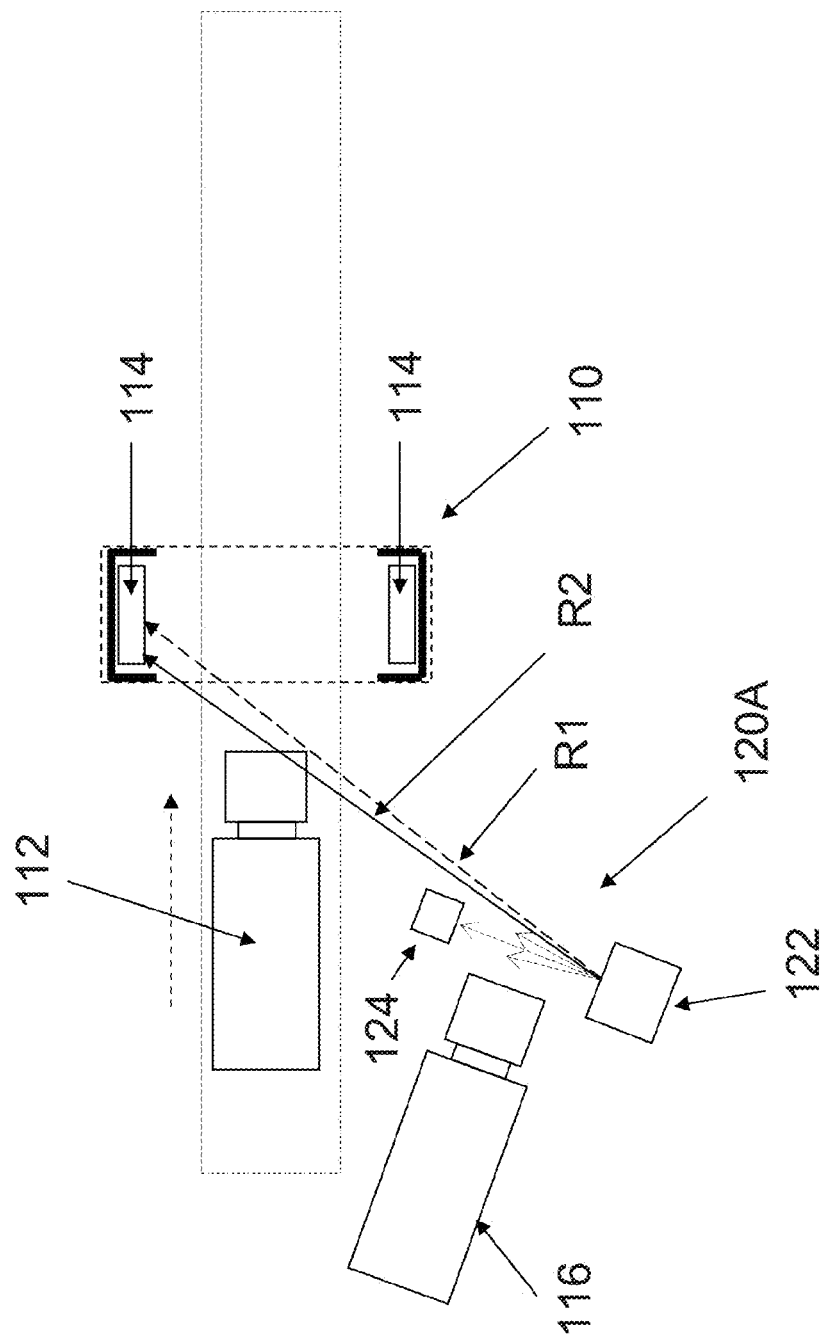

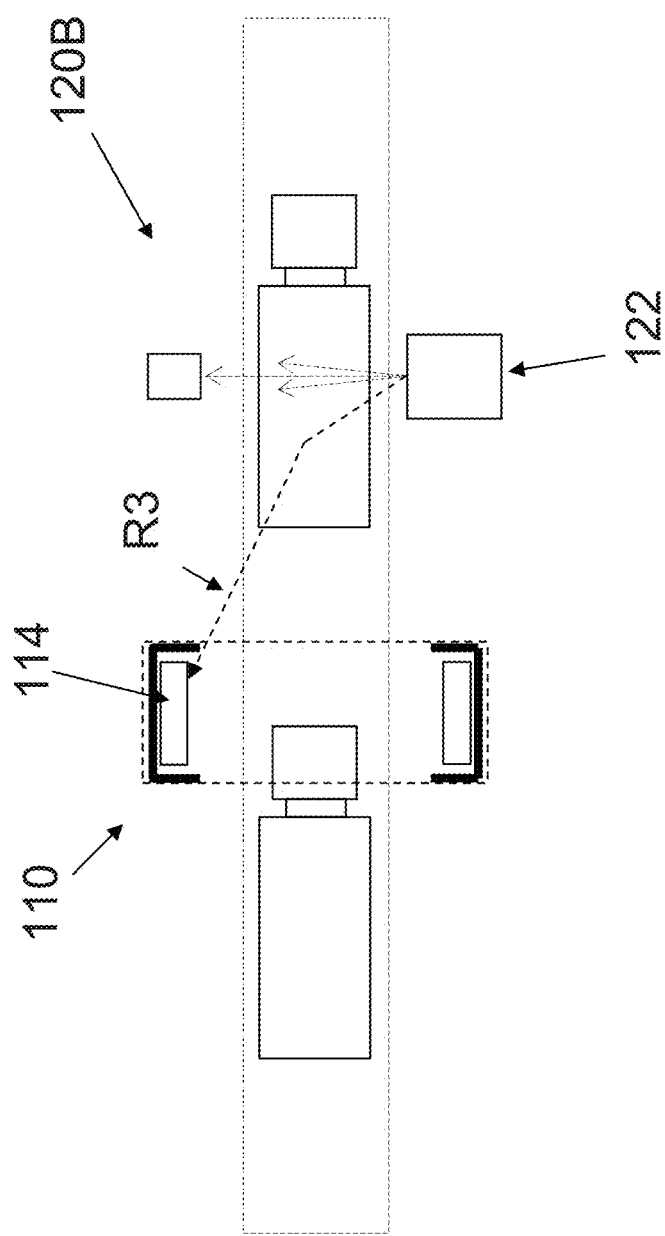

METHOD FOR AUTONOMOUS SELF-BLANKING BY RADIATION PORTAL MONITORS TO MINIMIZE THE INTERFERENCE FROM PULSED X-RAYS RADIATION

BACKGROUND ART

1. Field of Embodiments

This invention relates to the field of radiation detection systems for scanning of persons, luggage, parcels, vehicles and containers for the presence of illegal nuclear and radioactive materials. Specifically, this invention is related to methods and techniques of minimizing or removing the unintended interference from pulsed X-ray radiation generated by high-energy radiography systems, operating in proximity of passive radiation detection systems.

2. Summary of Related Art

Currently, second-generation high-energy radiography systems are being more frequently deployed alongside passive radiation detection systems, in order to interdict illegal transportation of contraband and other dangerous goods including nuclear and radioactive materials. It is well known that X-rays from nearby pulsed high-energy imaging systems can interfere with the radiation portal monitors (RPM) used to perform passive radiation monitoring. Such interference results in an increased count rate measured by the RPM which could lead to, for example, false alarms on vehicles with no radioactive materials present, when the additional counts increase RPM's measured signal above the set alarm threshold. Increased count rate could also raise the measured background above the actual background level when the X-ray interference occurs during RPM background acquisition, leading to a loss of sensitivity and decreased minimum detectable activity. Second order effects of the X-ray interference may also include: short-term gain shift, spectrum distortion, degraded energy resolution, incomplete pile-up rejection and decreased live time, all with negative effects on the RPM's detection performance.

Various solutions have been adopted in order to mitigate the effects of pulsed X-rays radiation from pulsed X-rays radiography systems on the nearby radiation portal monitors.

A first class of such solutions is using distance, time or shielding in order to minimize the X-rays detected by the RPM. For example, placing the radiography system 300-500 feet away from all the RPMs operating within one venue, could reduce the X-rays to a level that allows each RPM to operate virtually free of X-ray interference. The same effect could be achieved by surrounding radiography system with adequate shielding walls or imposing an exclusion mechanism between the time intervals when RPMs are operating and the times when radiography system(s) are allowed to operate. All three approaches described above, used alone or in combination, are simple, and, in some isolated cases, cost-effective ways to address the X-rays interference. They do not rely on any particular characteristics of radiography system and RPM. Unfortunately, practical constraints imposed by limited real-estate combined with prohibitive high cost of shielding walls, high volume of traffic, and very large number of RPMs and radiography system that have to operate in close proximity, reduce the number of sites where these solutions can be applied, to a very few isolated cases, while the vast majority remains with X-ray interference problem unsolved.

Another widely adopted class of solutions, called hardware or predictive blanking uses a modified RPM such that it is able to discard its input signals during a small time interval (typical less than 20 µs) while the X-rays pulse is generated by the radiography system. As X-rays pulse repetition rate ranges typically from 100 to 500 Hz, RPM will be blanked, in the worst case 20 µs every 2 ms, resulting in an equivalent 1% dead time. This additional dead time imposed by blanking, being less than 1% should, in theory, have negligible effect on the RPM's detection performance. The method requires a hardware synchronization signal generated by the radiography system. This logic signal known as blanking sync, becomes active a known time interval before the X-rays pulse is generated. While the time delay between blanking sync and X-ray pulse is approximately constant for a given system and operating mode, it has a wide range of values for different manufacturers and/or operating modes. RPM receives blanking sync from the X-ray imaging system, and generates an internal detector gating signal called blanking pulse. The blanking pulse is delayed with respect of the external blanking sync by a set amount known as blanking delay, and it is active for a set time interval known as blanking time. The values for blanking delay and blanking time are set such that the X-ray pulse falls always inside the blanking pulse with sufficient margins on both left and right sides. These tolerances are required to compensate for inherent timing jitter present in the signals involved from both participating systems: X-ray imaging and RPM. Blanking pulse is then distributed to each gamma and each neutron detector within the same RPM. For some implementations of this method, blanking delay and blanking time may have different values for each individual gamma and neutron detector within the same RPM. The RPM implementing this method is capable of disabling its gamma and neutron detectors while internal blanking pulse is active with the end effect of removing all pulses while the X-rays are being generated. Hardware blanking solution works relatively well when there is a single pulsed X-ray source, operating at a single energy with only one RPM needed to be blanked. The major disadvantage of this method is related to the requirement that there is a wired physical connection between the X-ray imaging system and RPM, therefore making it practically impossible to implement in the case of mobile X-rays imagining systems or when the blanking sync has to be distributed to a large number of RPMs. The solution becomes extremely difficult to implement when there are multiple radiography systems with different operating modes, (single energy, dual energy e.g., interleaved higher and lower energy pulses), and mobile systems, operating in close proximity of a large number of RPM systems.

There is a need in the art for an X-rays interference solution that allows for multiple and/or mobile radiography systems, including dual energy mode systems, operating in proximity to multiple radiation portal monitors that eliminates pulsed X-rays interference and renders the operation and specifically detection and nuclide classification performance, virtually unaffected by the pulsed X-rays generated by high-energy imaging systems.

SUMMARY OF THE EMBODIMENTS

In a first embodiment described herein, a method for isolating intended radiation signals for determining target characteristics includes: detecting by a first detector photons having first energies in a first range and generating first radiation signals in accordance therewith; receiving by a blanking delay module each of the first radiation signals from the first detector and applying a first predetermined time delay thereto; receiving by a first blanking switch each of the delayed first radiation signals; receiving by a discriminator each of the first radiation signals from the first detector and determining if it is an unintended radiation signal and, (i) if so determined, signaling the first blanking switch to blank the first delayed radiation signal in accordance with a first blanking time to create first delayed and blanked radiation signal; (ii) if not determined, signaling the first blanking switch not to blank the first delayed radiation signal; and receiving by a processing component via the first blanking switch one of the first delayed radiation signal or the first delayed and blanked radiation signal in order to determine one or more characteristics of the target.

In a second embodiment described herein, a method for isolating intended radiation signals for determining target characteristics includes: detecting by a first detector first pulses having first energies in a first range and generating first radiation signals in accordance therewith; receiving by a first blanking delay module each of the first radiation signals from the first detector and applying a first predetermined time delay thereto; receiving by a first blanking switch each of the delayed first radiation signals; detecting by a second detector second pulses having second energies in a second range and generating second radiation signals in accordance therewith; receiving by a second blanking delay module each of the second radiation signals and applying a second predetermined time delay thereto; receiving by a second blanking switch each of the delayed second radiation signals; receiving by a discriminator each of the first radiation signals from the first detector and determining if it is an unintended radiation signal and, (i) if so determined, signaling the first blanking switch and the second blanking switch to blank the first and second delayed radiation signals in accordance with a first and a second blanking time to create first and second delayed and blanked radiation signals; (ii) if not determined, signaling the first blanking switch and the second blanking switch not to blank the first and second delayed radiation signals; receiving by a processing component via the first blanking switch one of the first delayed radiation signal or the first delayed and blanked radiation signal in order to determine one or more characteristics of the target; and receiving by a second processing component via the second blanking switch one of the second delayed radiation signal or the second delayed and blanked radiation signal in order to determine one or more characteristics of the target.

BRIEF DESCRIPTION OF THE FIGURES

The following figures exemplify the embodiments described herein and are intended to be reviewed in combination with the detailed descriptions provided below.

FIG. 1 illustrates exemplary signals involved in implementation of hardware (predictive) blanking method in accordance with the description provided in the summary of the related art;

FIGS. 3a and 3b illustrate exemplary detection configurations which may make use of an embodiment described herein;

DETAILED DESCRIPTION

The embodiments described herein are directed to a self-blanking method wherein a radiation portal monitor (RPM) detects X-ray pulses based on one or more criteria, e.g., pulse shape analysis, and removes the identified X-ray pulses from the measured data on the fly. The RPM discriminates X-rays coming from nearby pulsed X-ray imagining systems from gamma rays due to natural background and/or any radioactive materials that may be present in/or transiting the area surrounding the RPM. The method does not require synchronization or any other type of signals from X-ray imaging systems, or any prior knowledge of the operating parameters of the X-ray imaging systems, such as: operating energy, X-ray pulse duration, single/dual energy interleaved, or other similar parameters. The self-blanking method eliminates pulsed X-ray interference from one or multiple imaging systems, with fixed locations and/or mobile systems, without the need of run-time parameters adjustment.

More particularly, the embodiments described herein use one or more of: amplitude difference between pulse X-ray sources and measured data, X-ray pulse duration and X-ray pulse shape characterization in order to isolate measured data, i.e., data representative of background gamma rays and/or radioactive materials within a target passing by the RPM.

Figure 2A:
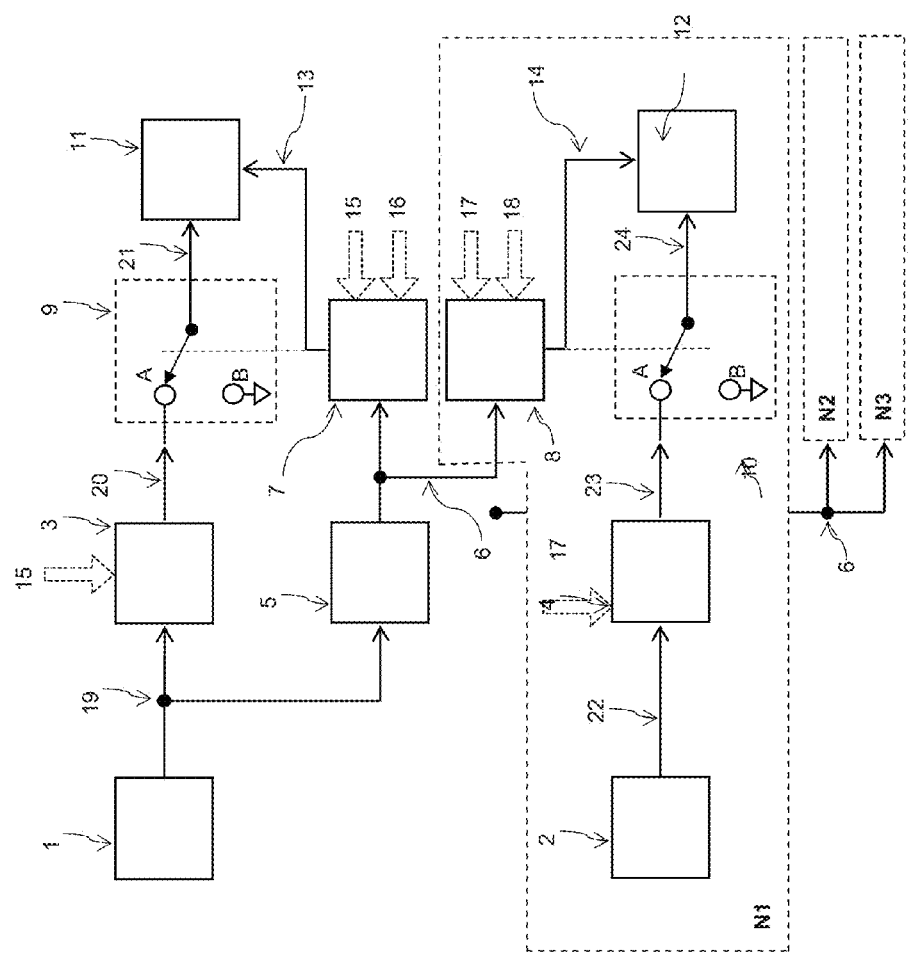
FIG. 2a illustrates an exemplary self-blanking method in accordance with an embodiment described herein.
Figure 2B:
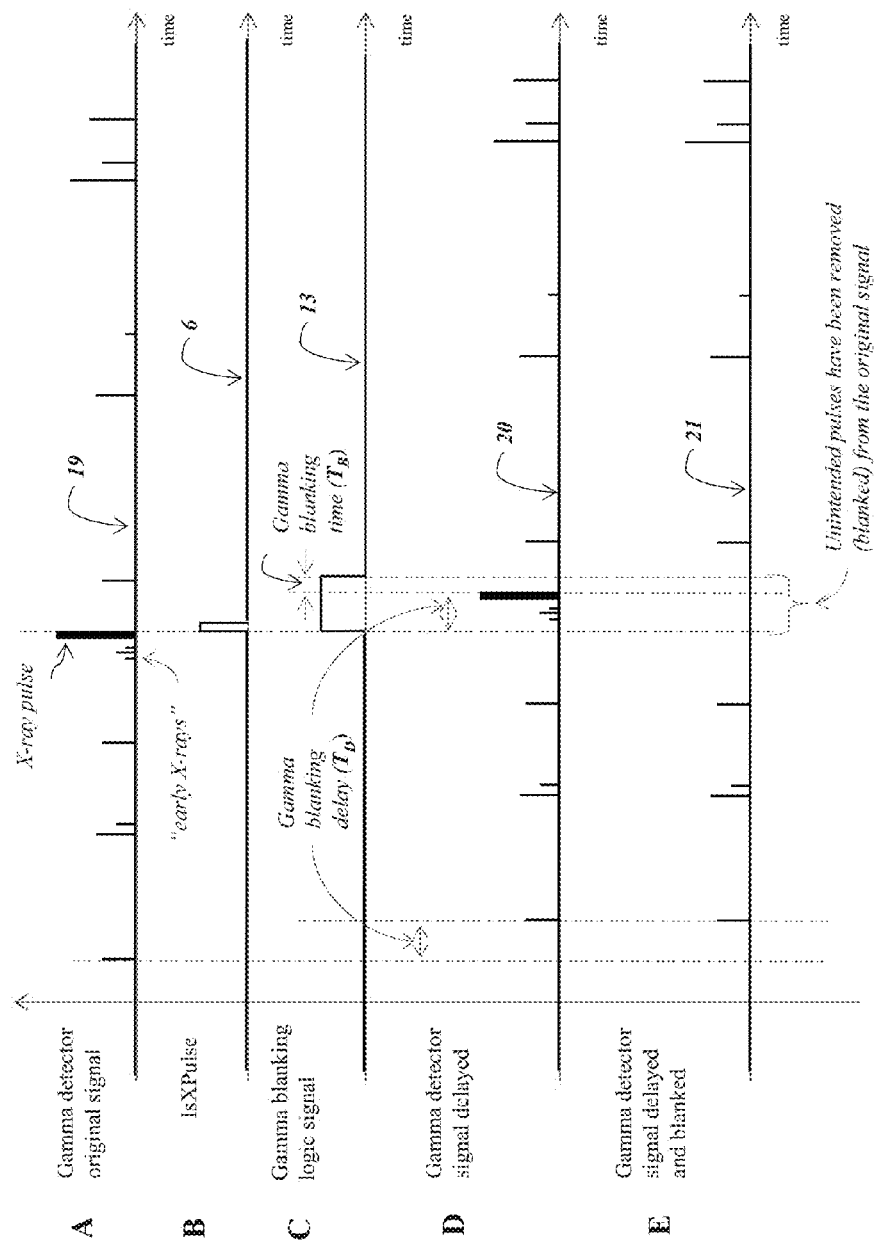
FIG. 2b illustrates an exemplary blanking signal diagram in accordance with an embodiment described herein.

FIG. 2a depicts a schematic example of a radiation detection system in accordance with an exemplary embodiment, in conjunction with FIG. 2b showing the timing diagram of most significant signals present in FIG. 2a. A gamma detector 1 generates an output signal 19, in response to photons incident to the detector that may include, in addition to intended photons, unintended X-ray photons from X-ray imaging system(s) operating nearby. The gamma detector output signal 19 is then applied to the input of an X-ray pulse discriminator module 5 and a gamma delay module 3. The gamma delay module 3, delays the signal 19 by a fixed delay set to a value, in the range of 1 to 100 µs, given by a gamma blanking delay parameter 15, producing at its output a gamma detector delayed signal 20 that is in every respect identical with gamma detector output signal 19 but delayed in time by a value equal to the gamma blanking delay parameter 15.

On a parallel path, a neutron detector 2 generates an output signal 22, in response to neutrons and high-energy photons incident to the neutron detector, that may include, in addition to intended radiation from neutrons, unintended X-ray photons from X-ray imaging system(s) operating nearby. It should be noted that while the following description makes reference to one neutron detection module—denoted as N1 in FIG. 2a—the embodiment of the invention has no limitations of the number of neutron detector modules that can be added. As an example, FIG. 2a illustrates the case when the number of neutron detector modules used is three, denoted as N1, N2, and N3. The neutron detector output signal 22 is then applied to the input of a neutron delay module 4. The neutron delay module 4, delays the signal 22 by a fixed delay set to a value, in the range of 1 to 100 µs, given by a neutron blanking delay parameter 17, producing at its output a neutron detector delayed signal 23 that is in every respect identical with neutron detector output signal 22 but delayed in time by a value equal to the neutron blanking delay parameter 17.

The X-ray pulse discriminator module 5 is capable of identifying X-ray pulses (also referred to herein as unintended pulses) from regular gamma-ray pulses (also referred to herein as intended pulses), based on characteristic attributes of the X-ray pulse such as: amplitude, width and shape. Specifically, one exemplary implementation of the X-ray pulse discriminator module 5 consists of a first level comparator that generates a first logic signal that is active when the signal 19 is higher than a set amplitude threshold (typically 66% of the signal 19's full scale), a first-order differentiator that differentiates the signal 19, followed by a second level comparator that generates a second logic signal that is active when the output of the first-order differentiator is less than a set threshold (typically 5% of the signal 19's full scale), and a time interval comparator that generates a third logic signal that is active when the duration of the second logic signal is longer than a set value (typically 0.5-1.0 μs). The first, the second, and the third logic signals are combined in a AND logic gate that generates a logic signal IsXPulse 6, that is active when all three logic input signals are active.

In one exemplary embodiment, the X-ray pulse discriminator module 5 generates the logic signal IsXPulse 6, for every X-ray pulse that has been identified as including pre-established identifying characteristics for one or more of amplitude, width and shape, and preferably, all three criteria. The time when this decision takes place is marked by the rising edge of the logic signal 6. The logic signal 6 is then transferred to the input of a gamma blanking control module 7 and a neutron blanking control module 8 for further processing. Gamma blanking control module 7 generates a gamma blanking logic signal 13 that has a duration controlled gamma blanking delay 15 and gamma blanking time 16, in the range of 1 to 100 μs. Gamma blanking logic signal 13 is active starting from the rising edge of the logic signal IsX-Pulse 6 and has a duration equal with the sum of gamma blanking delay 15 and gamma blanking time 16. Gamma blanking logic signal 13 controls the operation of a gamma blanking switch 9 such that the switch 9 is set in position "A" when gamma blanking signal 13 is inactive and in position "B" when the blanking signal 13 is active. Gamma blanking switch 9 generates a signal equal with gamma detector delayed signal 20 at all times when gamma blanking signal 13 is inactive and a signal ground (zero) when gamma blanking signal 13 is active, with the end effect of removing (blanking) from the original gamma detector signal 19, all pulses present in the time interval equal with gamma blanking delay 15 prior to the rising edge of the logic signal IsXPulse 6, and all pulses present in the time interval equal with gamma blanking time 16 after the rising edge of the signal IsXPulse 6. As a consequence of its operation, gamma blanking switch 9 generates a gamma detector signal delayed and blanked 21, that has been "purged" of all pulses occurring in a time interval equal with the sum of gamma blanking delay and gamma blanking time (gamma blanking delay before, and gamma blanking time after the X-ray pulse has been detected) as all these pulses are suspected of being caused or affected by the X-ray interference.

Gamma detector signal delayed and blanked 21 is then applied to input of a gamma spectrometer 11 that performs normal signal processing and generates the measured spectrum free of X-ray interference. Optionally, gamma blanking signal 13 could be input into the gamma spectrometer 11 providing information related with the dead time added by blanking. Gamma spectrometer 11 could use this information to perform a dead time correction if necessary and/or desired. Alternatively gamma spectrometer 11 could use the information provided by gamma blanking signal 13 to maintain a correct live time measurement and pass this value along with the measured spectrum.

Similarly, neutron blanking control module 8 generates a neutron blanking logic signal 14 that has a duration controlled neutron blanking delay 17 and neutron blanking time 18. Neutron blanking logic signal 14 is active starting from the rising edge of the logic signal IsXPulse 6 and has a duration equal with the sum of neutron blanking delay 17 and neutron blanking time 18, in the range of 1 to 100 μs. Neutron blanking logic signal 14 controls the operation of a neutron blanking switch 10 such that the switch 10 is set in position "A" when neutron blanking signal 14 is inactive and in position "B" when the blanking signal 14 is active. Neutron blanking switch 10 generates a signal equal with neutron detector delayed signal 23 at all times when neutron blanking signal 14 is inactive and a signal ground (zero) when neutron blanking signal 14 is active, with the end effect of removing (blanking) from the original neutron detector signal 22, of all pulses present in the time interval equal with neutron blanking delay 17 prior of the rising edge of the logic signal IsXPulse 6, and all pulses present in the time interval equal with neutron blanking time 18 after the rising edge of the signal IsXPulse 6. As a consequence of its operation, neutron blanking switch 10 generates a neutron detector signal delayed and blanked 24, that has been "purged" of all pulses occurring in a time interval equal with the sum of neutron blanking delay and neutron blanking time (neutron blanking delay before, and neutron blanking time after the X-ray pulse has been detected) as all these pulses are suspected of being caused or affected by the X-ray interference.

Neutron detector signal delayed and blanked 24 is then applied to input of a neutron spectrometer 12 that performs normal signal processing and generates a measured spectrum free of X-ray interference. Optionally, neutron blanking signal 14 could be input into the spectrometer 12 providing information related with the dead time added by blanking. The spectrometer 12 could use this information to perform a dead time correction if necessary and/or desired. Alternatively the spectrometer 12 could use the information provided by blanking signal 14 to maintain a correct live time measurement and pass this value along with the measured spectrum.

It should be noted that the rising edge of the logic signal IsXPulse 6 occurs at the time when the X-ray pulse has completely returned to the baseline value. As a consequence, the information that an X-ray pulse has been detected is available at the time when the X-ray pulse is already part of the data stream to be processed by both gamma and neutron processing modules 11 and 12. In the absence of the delay modules 3 and 4, the X-ray pulse would be already processed and recorded in the measured data by both processing modules 11 and 12, by the time the logic signal IsXPulse 6 becomes active. Moreover, the delay modules 3 and 4, become strictly necessary when the pulsed X-ray source used by the radiography system is of the type known as "betatron". It is well known that this type of X-ray source is prone to produce "early X-rays" before the main, full energy X-ray pulse. Even if "early X-rays" are not detected by the X-ray pulse discriminator module 5, they are completely removed by blanking as they occur within blanking delay time interval, prior to the main X-ray pulse.

Referring to FIG. 2b, diagrams A-E illustrate the various blanking signals versus time in accordance with the embodiment described with reference to FIG. 2a. While FIG. 2b exemplifies the delay and blanking with reference to the gamma detector, one skilled in the art recognizes that the same concepts apply in the parallel paths for additional detectors (e.g., neutron detector modules N1, N2, N3).

More particularly, diagram A shows an exemplary gamma detector output signal (19 in FIG. 2a), containing an unintended X-ray pulse preceded by several "early X-ray pulses". Diagram B shows the IsXPulse 6 from FIG. 2a which drives blanking signal 13 with blanking time T$_B$ (diagram C). Next, diagram D shows the delay gamma output signal 20 from diagram A after it has been delayed T$_B$ by the delay module (3 in FIG. 2*a*.) and finally diagram E depicts the delayed and blanked gamma detector signal 21 after all unintended pulses (X-ray main pulse and potential "early X-rays") have been removed from the original detector signal.

The types of individual detectors referenced in the exemplary system in FIG. 2*a* may be used to scan for and detect special nuclear material (SNM) which are used to create atomic weapons, radiological dispersal devices (RDD or "dirty bombs"), and other types of radioactive materials. While the individual systems, and in particular the detectors, are intended to receive and process a specific type of radiation, the individual systems may detect stray signals from other systems operating in proximity thereto. This results in inaccurate performance of the first system, e.g., obscured results, false alarms, etc. A more detailed description of the various types of scanning systems that may be utilized in conjunction with the process described herein is found in one or more of the following United States patents which are incorporated herein by reference in their entirety: U.S. Pat. No. 7,045,787; U.S. Pat. No. 6,255,654; U.S. Pat. No. 6,507,025; U.S. Pat. No. 7,408,160; U.S. Pat. No. 6,552,346; U.S. Pat. No. 7,365,332; U.S. Pat. No. 7,368,717; U.S. Pat. No. 7,388,205; U.S. Pat. No. 7,335,887; U.S. Pat. No. 7,039,159; U.S. Pat. No. 7,215,738; U.S. Pat. No. 7,352,844; U.S. Pat. No. 7,596,275; U.S. Pat. No. 7,453,987; U.S. Pat. No. 7,166,844; U.S. Pat. No. 7,388,209; U.S. Pat. No. 7,430,479; U.S. Pat. No. 7,742,568; U.S. Pat. No. 7,957,506 and U.S. Pat. No. 8,116,431. Additionally, commonly owned U.S. patent application Ser. No. 11/033,552 entitled System and Method for Measuring and Analyzing Target Emissions is also incorporated herein by reference in its entirety.

Additionally, while one or more neutron detectors are discussed with reference to the embodiment in FIG. 2*a*, the self blanking method may be utilized to blank only the gamma detector. Further, one skilled in the art recognizes that the functionality represented and described with reference to FIG. 2*a* may be implemented through software, hardware or a combination thereof.

In FIG. 3*a*, a more specific example of the dual radiation detection system in FIG. 2*a* includes two different detection systems 110 and 120A operating in proximity to one another. The passive system 110, is used to scan all or some portion of the vehicle 112 as it drives between detector panels 114. Exemplary embodiments of system 110 include Science Applications International Corporation's EXPLORANIUM AT-980, AT-900, ST-20 and SRM-910 Radiation Portal Monitors. Similarly, system 120A is representative of an active scanning system, wherein a x-ray source 122 generates x-rays, e.g., at approximately 5-7 MeV and 8-10 MeV of linac and approximately 5-7.5 MeV range for betatron source, which pass through vehicle 116 and are received at detector 124. The system 120A in FIG. 3*a* is intended to represent a mobile or movable system, such as that shown in FIG. 3A of U.S. Pat. No. 7,408,160, which is incorporated herein by reference and which is physically embodied in commercially available products such as Science Applications International Corporation's VACIS M6500 Mobile Imaging System. It is common for multiple scanning systems such as those described herein to be simultaneously operated within proximity to one another in order to efficiently and effectively monitor the contents of cargo at border crossings, ports or other checkpoints.

In FIG. 3*b*, an alternative configuration shows two different detector systems 110 and 120B, wherein the features and operation of system 110 are identical to those described with reference to FIG. 3*a* and the features and operation of system 120B are identical to those described with reference to 120A except 120B is a stationary system. As shown, systems 110 and 120B may simultaneously operate on different vehicles, but as exemplified by ray R3, unintended radiation from source 122 may be detected by one or more detectors 114. The embodiments for identification and blanking as described herein may be utilized. As a further alternative, it may be possible to operate the source 122 of systems 120A and 120B in a dual mode configuration, wherein operation at either 5-6 MeV or 8-10 MeV is selectable. This includes an interlaced operation wherein the two energies are alternately used as described in U.S. Pat. No. 7,453,987 which is incorporate herein by reference.

Importantly, the detectors 114 of system 110 may include different types of individual detectors for detecting emissions having different energies. As described in commonly owned U.S. patent application Ser. No. 11/033,552 which is incorporated herein by reference and entitled System and Method for Measuring and Analyzing Target Emissions, FIG. 1 of this application illustrates a detector stand that includes both neutron and gamma ray detectors. Importantly, gamma ray detectors are sensitive to source generator x-rays such as those generated by source 122 of system 120A. As is known in the art, shielding and focusing technologies are utilized in order to confine the emitted x-ray radiation to a designated scanning area, but these technologies are not perfect. There is still some amount of stray radiation that escapes confinement. Since the detectors 114 are sensitive, that is, they are calibrated to measure small amounts of radiation emitted by materials in the passing targets, it is understandable that additional stray radiation from an x-ray source could mask gamma and/or neutron data emitted from a target or cause a false-positive. For exemplary purposes, detectors 114 may include polyvinyl toluene (PVT) detectors which have been shown to be capable of detecting radiation from both gamma-ray and neutron sources as discussed in the Sandia Report entitled PVT-NG Sensor Final Report printed January 2012 which is incorporated herein by reference in its entirety. As discussed above, predictive blanking has been implemented in the prior art and involves an external device for detecting the radiation from the sources 122 and essentially telling the detectors 114 when to "blank." The embodiments described herein do not use an external device to provide the blanking signal. Instead, the system 110 is modified per the description in FIG. 2*a* to include a self-blanking feature which implements one or more signal processing methodologies to effectively remove the unintended x-ray radiation from the detected data. Assuming the detected data is (intended radiation+unintended radiation), wherein the intended radiation contains information regarding the contents of the target being scanned by detectors 114 and the unintended radiation does not, the processes described herein work to process the detected data to identify and remove the unintended radiation per the process described in accordance with the schematic of FIG. 2*a*.

Figure 4A:
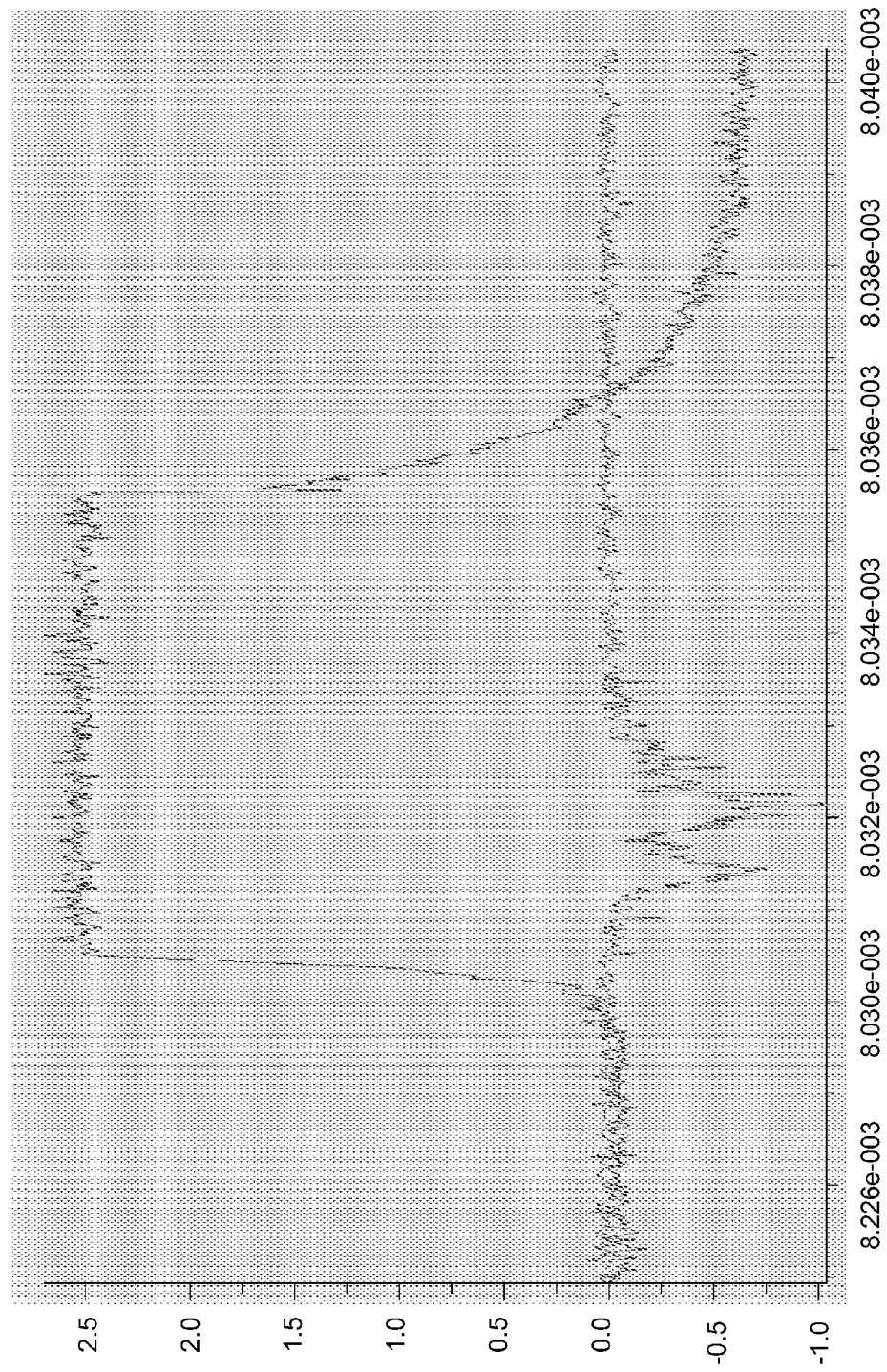
FIGS. 4a and 4b illustrate exemplary pulse attributes (amplitude, shape and duration) that may be utilized to identify and blank an unintended pulse in accordance with an embodiment described herein.

As discussed above in the example provided with reference to FIG. 2*a*, the x-ray pulse discriminator identifies various pulse characteristics to determine if the pulse is an unintended x-ray pulse. The signal processing methodologies implemented by the discriminator for identifying the characteristics utilize anticipated attributes of the unintended impinging radiation in order to selectively remove (or blank) the unintended radiation signals from the detected signals. Referring to FIG. 4*a*, it is anticipated that full energy x-ray pulses at, e.g., 6.5 MeV and 9.0 MeV, that are incident on detectors 114 will have amplitudes that are higher than a set threshold.

Accordingly, referring back to FIG. 3a for situations wherein some portion R1 of the source 122 generated energy impinges directly on a detector 114, it is expected that the amplitude of the resulting detected signal will exceed a predetermined threshold and thus be easily identifiable and removed. More particularly, FIG. 4a illustrates an exemplary near field direct x-ray signal and shows that the resulting signal has an amplitude that is essentially off the scale and significantly above an intended radiation threshold. Similarly, even a far field x-ray signal that is facing a detector 114 has an amplitude that is significantly above an intended radiation threshold (see FIG. 4b). These amplitudes for the unintended x-ray signals as illustrated in FIGS. 4a and 4b can be compared to the amplitudes expected from an intended radiation signals, e.g., gamma ray signals, shown in FIGS. 5a (high energy) and 5b (low energy) which are significantly lower.

Figure 4B:
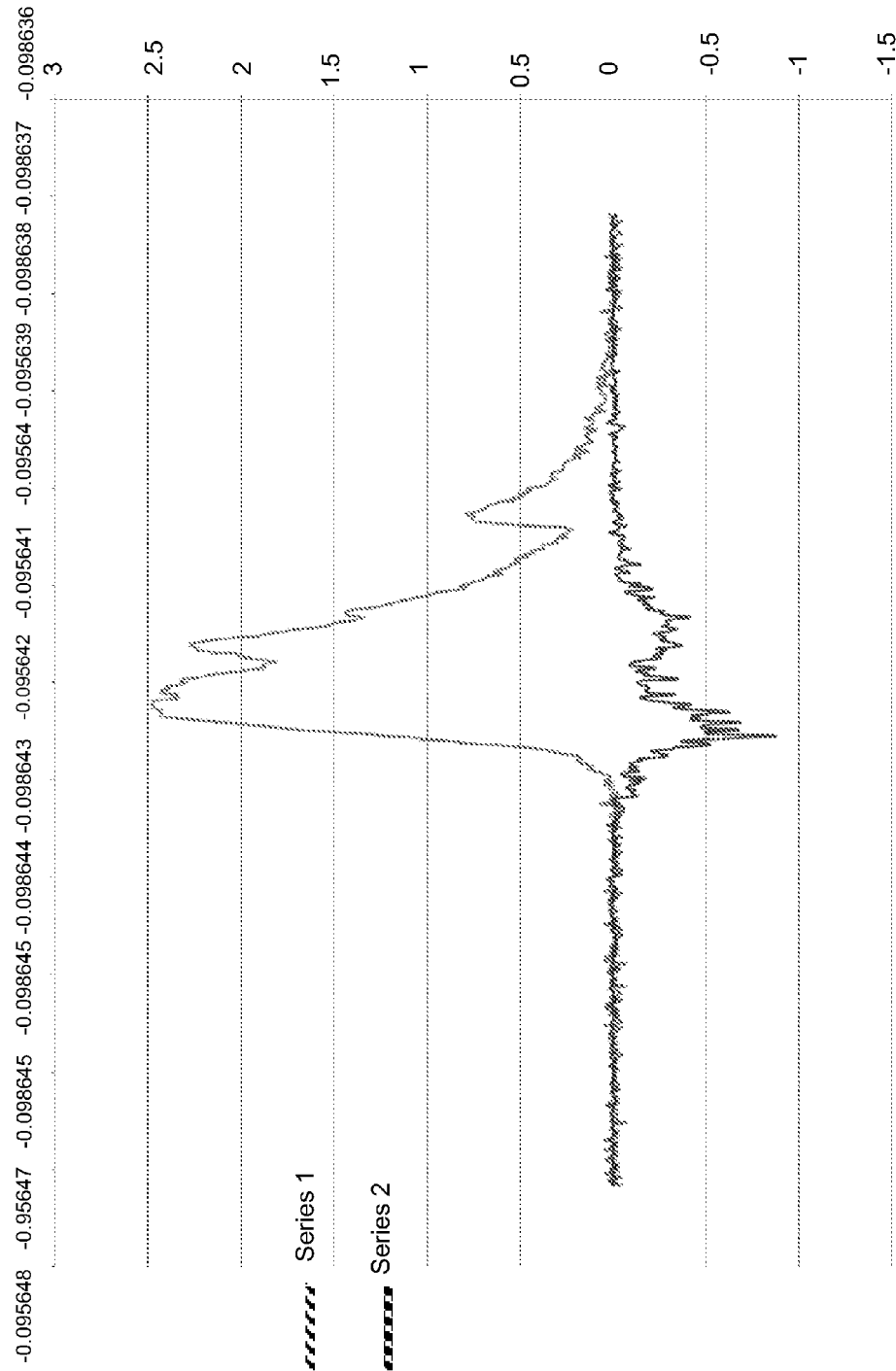
Figure 5A:
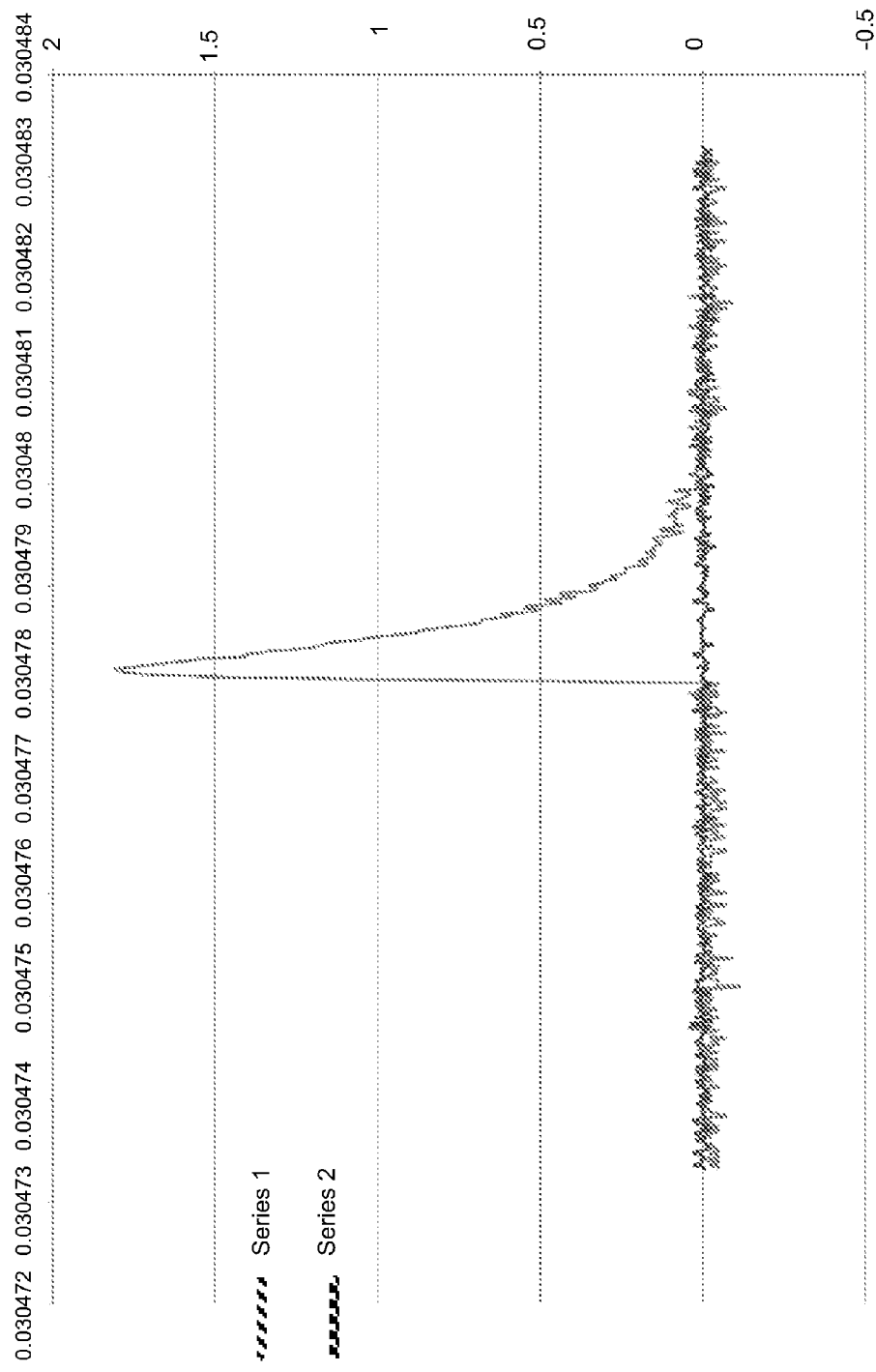
FIGS. 5a and 5b illustrate exemplary pulse attributes from intended pulses that may be compared with details from 4a and 4b to identify and blank an unintended pulse in accordance with an embodiment described herein.
Figure 5B:
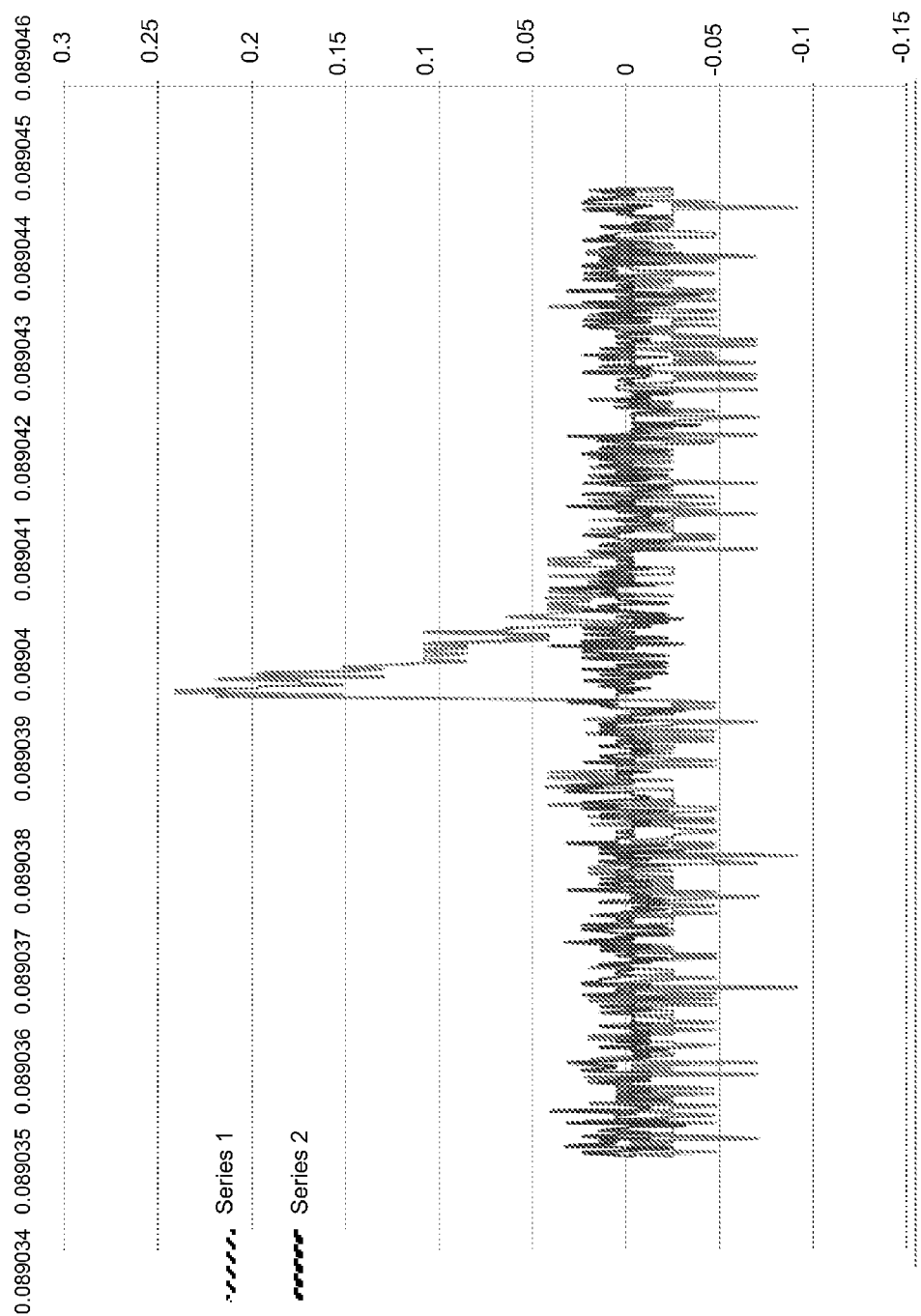

It is also anticipated that scattered x-ray pulses will likely generate pile-up events when detected by detectors 114 even when they have lost their primary energy, (see FIG. 4b). The scattered x-ray pulses represent source x-rays that have taken an indirect path to the detector 114. More specifically, scattered x-rays have encountered a structure, thus changing the attributes of the scattered x-ray signal in one or more ways from the original, un-scattered signal emitted from the source 122. Accordingly, referring back to FIG. 3a for situations wherein some portion R2 of the source 122 generated energy encounters a structure, e.g., truck cab 112, and then impinges on a detector 114, it is expected that the scattered x-ray signal will generate pile-up events and that such pile-up events will be identified and the corresponding signals removed from the detected data. Pulse pile-up happens when pulses arrives closer in time than the pulse resolution time for the detector 114. When pile-up occurs, the detector returns inaccurate pulse height information. For example, the separate pulse may be incorrectly viewed as a single pulse when the pulses are very close in time and amplitude will be calculated by adding the two amplitudes, e.g., peak pile-up. The detector could also record the overlapping signals as two separate events, but calculate incorrect pulse amplitude due to the overlap, e.g., tail pile-up. Since the intended radiation is not expected to produce pile-up since the detectors 114 are tailored to avoid such an phenomenon in the range of the intended radiation, pile-up events can be attributed to unintended radiation and thus removed.

While various embodiments of the invention have been described and illustrated, one skilled in the art recognizes that there are variations to these embodiments and implementations thereof that are and would be considered to be within the scope of those embodiments.

The invention claimed is:

1. A method for isolating intended radiation signals for determining target characteristics comprising:
   detecting by a first detector photons having first energies in a first range and generating first radiation signals in accordance therewith;
   receiving by a blanking delay module each of the first radiation signals from the first detector and applying a first predetermined time delay thereto;
   receiving by a first blanking switch each of the delayed first radiation signals;
   receiving by a discriminator each of the first radiation signals from the first detector and determining if it is an unintended radiation signal and,
   (i) if so determined, signaling the first blanking switch to blank the first delayed radiation signal in accordance with a first blanking time to create first delayed and blanked radiation signal;
   (ii) if not determined, signaling the first blanking switch not to blank the first delayed radiation signal;
   receiving by a processing component via the first blanking switch one of the first delayed radiation signal or the first delayed and blanked radiation signal in order to determine one or more characteristics of the target.

2. The method according to claim 1, further comprising receiving by the processing component from a first blanking control module a first pulse discriminator signal for each of the first radiation signals.

3. The method according to claim 1, wherein determining if a first radiation signal is an unintended radiation signal includes determining if a predetermined criteria for at least one of amplitude, width and shape of the first radiation signals is met.

4. The method according to claim 1, wherein determining if a first radiation signal is an unintended radiation signal includes determining if each of a predetermined criteria for amplitude, width and shape of the first radiation signals is met.

5. The method according to claim 1, wherein the first predetermined time delay is between 1 to 100 microseconds.

6. The method according to claim 1, wherein the first blanking time is between 1 to 100 microseconds.

7. The method according to claim 1, wherein the photons include first energies indicative of x-rays and gamma rays.

8. The method according to claim 1, wherein determining if a first radiation signal is an unintended radiation signal includes comparing by a first comparator the first radiation signal to a first set amplitude threshold and if determined to be higher than the first set amplitude threshold, generating a first logic signal.

9. The method according to claim 8, wherein determining if a first radiation signal is an unintended radiation signal further includes:
   differentiating by a first-order differentiator, the first radiation signal;
   comparing by a second comparator the differentiated first radiation signal to a second set amplitude threshold and if determined to be less than the second set amplitude threshold, generating a second logic signal;
   comparing by a third comparator a duration of the second logic signal to a set duration value and if determined to be longer that the set duration value, generating a third logic signal;
   and combining the first, the second, and the third logic signals to form a blanking signal.

10. A method for isolating intended radiation signals for determining target characteristics comprising:
   detecting by a first detector first pulses having first energies in a first range and generating first radiation signals in accordance therewith;
   receiving by a first blanking delay module each of the first radiation signals from the first detector and applying a first predetermined time delay thereto;
   receiving by a first blanking switch each of the delayed first radiation signals;
   detecting by a second detector second pulses having second energies in a second range and generating second radiation signals in accordance therewith;
   receiving by a second blanking delay module each of the second radiation signals and applying a second predetermined time delay thereto;
   receiving by a second blanking switch each of the delayed second radiation signals;

receiving by a discriminator each of the first radiation signals from the first detector and determining if it is an unintended radiation signal and,
   (i) if so determined, signaling the first blanking switch and the second blanking switch to blank the first and second delayed radiation signals in accordance with a first and a second blanking time to create first and second delayed and blanked radiation signals;
   (ii) if not determined, signaling the first blanking switch and the second blanking switch not to blank the first and second delayed radiation signals;
receiving by a processing component via the first blanking switch one of the first delayed radiation signal or the first delayed and blanked radiation signal in order to determine one or more characteristics of the target; and
receiving by a second processing component via the second blanking switch one of the second delayed radiation signal or the second delayed and blanked radiation signal in order to determine one or more characteristics of the target.

11. The method according to claim 10, further comprising receiving by the processing component from a first blanking control module a first pulse discriminator signal for each of the first radiation signals.

12. The method according to claim 10, further comprising receiving by the processing component from a second blanking control module a second pulse discriminator signal for each of the second radiation signals.

13. The method according to claim 10, wherein determining if a first radiation signal is an unintended radiation signal includes determining if a predetermined criteria for at least one of amplitude, width and shape of the first radiation signals is met.

14. The method according to claim 10, wherein determining if a first radiation signal is an unintended radiation signal includes determining if each of a predetermined criteria for amplitude, width and shape of the first radiation signals is met.

15. The method according to claim 10, wherein the first predetermined time delay is between 1 to 100 microseconds.

16. The method according to claim 10, wherein the second predetermined time delay is between 1 to 100 microseconds.

17. The method according to claim 10, wherein the first blanking time is between 1 to 100 microseconds.

18. The method according to claim 10, wherein the second blanking time is between 1 to 100 microseconds.

19. The method according to claim 10, wherein the first pulses include first energies indicative of x-rays and gamma rays.

20. The system according to claim 10, wherein the second pulses include second energies indicative of neutrons.

\* \* \* \* \*